(No Model.)
J. W. LEETE.
THILL COUPLING.
No. 465,628.                    Patented Dec. 22, 1891.
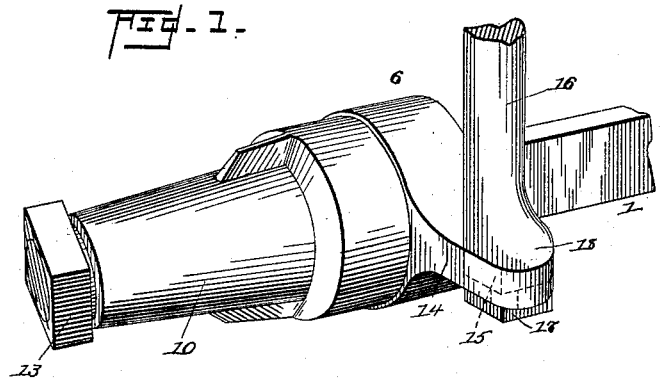
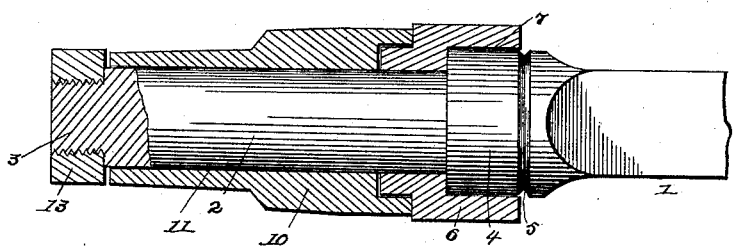
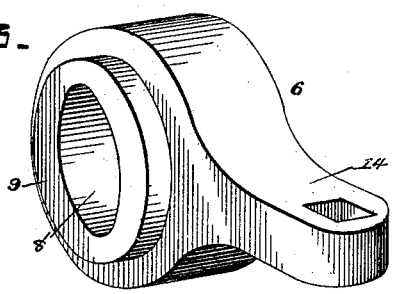
Witnesses:                                      Inventor
                                            John W. Leete.

UNITED STATES PATENT OFFICE.

JOHN W. LEETE, OF HARTFORD, CONNECTICUT.

THILL-COUPLING.

SPECIFICATION forming part of Letters Patent No. 465,628, dated December 22, 1891.

Application filed December 6, 1890. Serial No. 373,771. (No model.)

*To all whom it may concern:*

Be it known that I, JOHN W. LEETE, a citizen of the United States, residing at Hartford, in the county of Hartford and State of Connecticut, have invented a new and useful Thill-Coupling, of which the following is a specification.

This invention has relation to improvements in thill-couplings; and the objects are to provide an extremely simple, cheap, and durable coupling for connecting the thills to the shafts and to avoid in the same any joints liable to wear and rattle, thus doing away with the necessity of the employment of any of the numerous forms of anti-rattlers, and, furthermore, to so locate said couplings as to permit of an elevation of the shafts or thills at the sides of the vehicle and out of the way.

With the above objects in view the invention consists in certain features of construction hereinafter specified, and particularly pointed out in the claims.

Referring to the drawings, Figure 1 is a perspective of a portion of an axle provided with a thill-coupling constructed in accordance with my invention. Fig. 2 is a longitudinal section of the axle-coupling and sleeve or box. Fig. 3 is a detail in perspective of the coupling removed.

Like numerals of reference indicate like parts in all the figures of the drawings.

The axle 1 is reduced at its ends in the usual manner to form the spindle or bearing portion 2, which terminates in the usual threaded end 3. The reduction of the axle to form the spindle or bearing portion causes a shoulder 4 to be formed at the junction of the axle and spindle, and in rear of said shoulder, which is annular, there is formed therein an annular groove or drip-passage 5.

The thill-coupling comprises a metallic sleeve 6, provided with an internal bore 7, adapting the same to fit over and loosely upon the shoulder 4 of the axle, and said bore is reduced at its outer end, as at 8, and surrounded by an annular flange or collar 9, the reduced bore fitting loosely upon the spindle. The inner face of the coupling occurs about opposite the annular groove 5, so that the latter receives any moisture that would otherwise work into the coupling and is directed to the lower side of the axle from which it may readily drip.

Various means may be employed for rendering the coupling sand and water tight without departing from the spirit of my invention.

10 designates the axle box or sleeve, which is of the usual construction, and is provided with the internal bore 11 and at its rear end with the hollow swell, which loosely embraces and receives the annular flange or collar 9 of the coupling. The box or sleeve is slightly shorter than the distance from the outer face of the coupling, and the nut 13, when applied, does not bear against the outer end of the sleeve, as will be apparent.

From the front side of the coupling-sleeve there extends a perforated lug 14, and in the same terminates the reduced and in cross-section, preferably, square or rectangular tenon 15 of the shank-iron 16 of the thill. The lower end of the tenon is reduced and threaded, and is provided with a nut 17, which serves to bind or clamp the perforated lug or extension of the coupling between the shoulder 18 formed by the reduced tenon 15 and the nut itself.

From the above construction it will be apparent that I have provided a thill-coupling which, by reason of its location, will permit of the thills being elevated at each side of the vehicle instead of in front of the same; that said coupling is sufficiently loose to work upon the axle in accordance with the motion of the horse; that all loose wearing and rattling joints are obviated, and, finally, that the couplings may be reversed so that when they become worn upon one side by reversing the same practically new couplings are provided.

Having described my invention, what I claim is—

1. The combination, with an axle terminating in a reduced bearing and provided at the inner end of the bearing with an annular shoulder, of a thill-coupling sleeve having an internal bore fitting the shoulder and provided at its inner side with a reduced bore fitting the bearing and provided opposite the same with an annular external reduced portion, an axle box or sleeve fitting the spindle and provided at its inner end with a swell internally bored and fitting the reduced portion of the coupling-sleeve, and a thill connected to said coupling-sleeve, substantially as specified.

2. The combination, with the axle, of the coupling-sleeve loosely mounted on the same and provided with a laterally-extending lug having a perforation rectangular in cross-section, a thill terminating in a rectangular tenon forming a shoulder and reduced and screw-threaded at its lower end, mounted in the perforation, and a nut threaded on the lower end of the tenon, substantially as specified.

In testimony that I claim the foregoing as my own I have hereto affixed my signature in presence of two witnesses.

JOHN W. LEETE.

Witnesses:
J. H. SIGGERS,
J. A. SAUL.